(12) United States Patent
Yu et al.

(10) Patent No.: US 11,816,174 B2
(45) Date of Patent: Nov. 14, 2023

(54) ENHANCED SEARCH WITH MORPHED IMAGES

(71) Applicant: eBay Inc., San Jose, CA (US)

(72) Inventors: Yi Yu, Shanghai (CN); Jingying Wang, Shanghai (CN); Kaikai Tong, Shanghai (CN); Jie Ren, Shanghai (CN); Yuqi Zhang, Shanghai (CN)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 17/706,910

(22) Filed: Mar. 29, 2022

(65) Prior Publication Data

US 2023/0315797 A1    Oct. 5, 2023

(51) Int. Cl.
*G06F 16/957* (2019.01)
*G06F 16/332* (2019.01)
*G06T 3/00* (2006.01)

(52) U.S. Cl.
CPC ........ *G06F 16/957* (2019.01); *G06F 16/3326* (2019.01); *G06T 3/0093* (2013.01)

(58) Field of Classification Search
CPC .. G06F 16/957; G06F 16/3326; G06T 3/0093
USPC ........................................................ 707/706
See application file for complete search history.

(56) References Cited

U.S. PATENT DOCUMENTS

| | | | |
|---|---|---|---|
| 7,952,593 B2 | 5/2011 | Niu et al. | |
| 9,483,548 B2 | 11/2016 | Becherer et al. | |
| 10,769,444 B2 | 9/2020 | Moore et al. | |
| 11,055,888 B2 | 7/2021 | Han et al. | |
| 2012/0294537 A1* | 11/2012 | Wallace | G06V 10/245 382/201 |
| 2014/0089295 A1* | 3/2014 | Becherer | G06F 16/3328 707/769 |
| 2020/0175290 A1* | 6/2020 | Raja | G06V 40/172 |
| 2020/0356591 A1 | 11/2020 | Yada et al. | |
| 2021/0182950 A1 | 6/2021 | Makkapati | |

FOREIGN PATENT DOCUMENTS

CN    111696029 A    9/2020

OTHER PUBLICATIONS

Fish et al.: "Image Morphing with Perceptual Constraints and STN Alignment", Image Morphing with Perceptual Constraints and STN Alignment, Apr. 29, 2020 (Year: 2020).*

(Continued)

*Primary Examiner* — Kuen S Lu
(74) *Attorney, Agent, or Firm* — SHOOK, HARDY & BACON LLP

(57) ABSTRACT

A search system performs item searches using morphed images. Given two or more input images of objects, the search system uses a generative model to generate one or more morphed images. Each morphed image shows an object of the object type of the input images. Additionally, the object in each morphed image combines visual characteristics of the objects in the input images. The morphed images may be presented to a user, who may select a particular morphed image for searching. A search is performed using a morphed image to identify items that are visually similar to the object in the morphed image. Search results for the items identified from the search are returned for presentation.

17 Claims, 6 Drawing Sheets

(56) References Cited

OTHER PUBLICATIONS

Liao et al.: "Automating Image Morphing Using Structural Similarity on a Halfway Domain", ACM Transactions on Graphics, vol. 33, No. 5, Article 168, Publication date: Aug. 2014. (Year: 2014).*
N. Fish et al., "Image Morphing with Perceptual Constraints and STN Alignment", Available at <https://arXiv.org>, Apr. 29, 2020, 11 pages.
Extended European Search Report Received for European Patent Application No. 23161195.5, dated Aug. 11, 2023, 8 pages.

* cited by examiner

ENHANCED SEARCH WITH MORPHED IMAGES

BACKGROUND

Search engines facilitate users in quickly finding items in electronic databases, such as, for instance, databases of images or products. Search engines receive user queries from users and provide search results for items that are responsive to the user queries. For a given user query, a search engine can process the user query, user data, contextual data, and/or other inputs to identify the most relevant items for the particular user query. Search results for identified items can be presented on a user device in several different forms on a search results user interface. While search engines are powerful tools, there are inherent limitations with conventional search approaches that limit the ability of users to submit search queries that adequately capture the users' intent. As a results, search engines often return unwanted search results, instead of, or even in addition to, search results sought. This typically requires users to submit new search queries to the search engine in an attempt to obtain search results for items that satisfy the users' intent.

SUMMARY

Embodiments of the present technology relate to, among other things, a search system that searches for items using morphed images of objects. In accordance with aspects of the technology described herein, two or more input images of objects are received. The input images may be of a particular object type, such as a shirt or handbag. The search system uses a generative model to generate one or more morphed images of objects based on the input images. For instance, given two images of shirts, the generative model generates a morphed image of a virtual shirt. The object in a morphed image combines visual characteristic of the objects in the input images. In some cases, morphed images created by the generative model are provided for presentation to a user, who may select a particular morphed image for searching. A search is performed, for instance, on an item database, using a morphed image to identify items that are visually similar to the object in the morphed image. Search results for items identified from the search are then provided for presentation.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Overview

Figure 1:
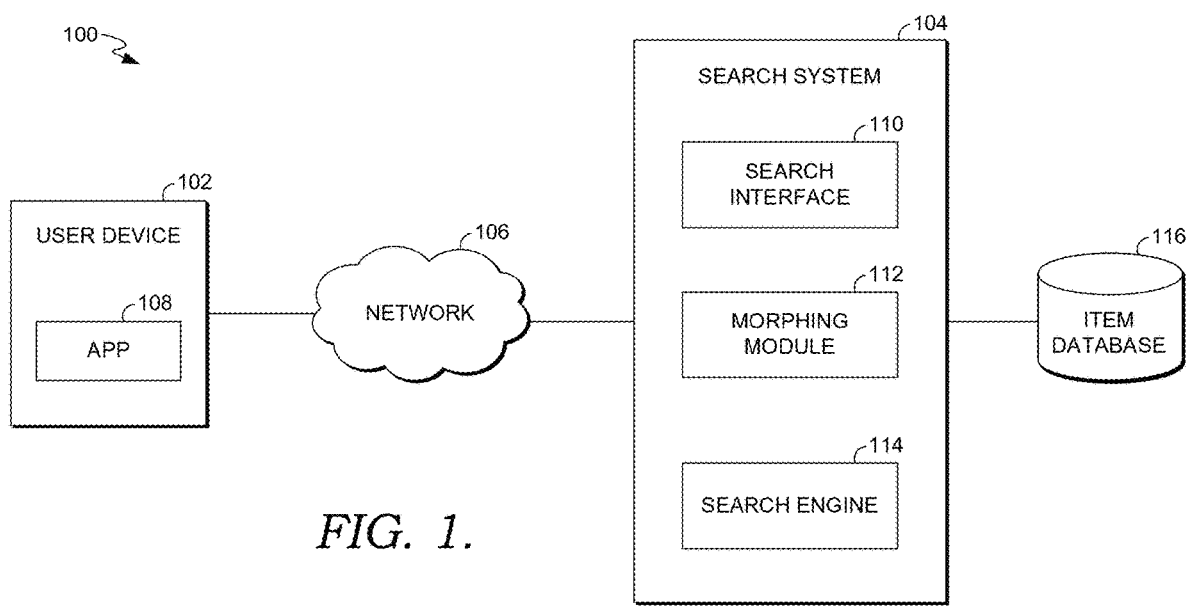
FIG. 1 is a block diagram illustrating an exemplary system in accordance with some implementations of the present disclosure.

While search engines are incredibly useful tools for locating items, shortcomings in existing search technologies often result in the consumption of an unnecessary quantity of computing resources (e.g., I/O costs, network packet generation costs, throughput, memory consumption, etc.). When performing searches, in some instances, users may be seeking items with particular visual characteristics. Many conventional search engines perform searches using text queries submitted by users. However, it is often difficult for users to select text queries that adequately capture desired visual features of items they are seeking. Some conventional search engines enable image-based search in which users can enter an image as a search query to identify similar items. This approach is also often insufficient because users are typically unable to find images of items with the exact visual characteristics desired by the users. As a results, users often have to submit multiple queries before finding desired items. For example, a user may issue a first query to a search engine that returns a set of search results. The user may browse the search results and select certain search results to access the corresponding items. Selection of items causes retrieval of the items from various content sources. Additionally, in some cases, applications supporting those items are launched in order to render the items. Often, the search results returned by the search engine don't satisfy the user's goal, requiring the user to spend more time on the search process by repeating the process of issuing additional queries and selecting certain search results until the user finally accesses a desired item or, in some cases, the user gives up because the search engine was not above to return desired search results even after multiple searches.

These repetitive inputs result in increased computing resource consumption, among other things. For instance, repetitive user queries result in packet generation costs that adversely affect computer network communications. Each time a user issues a query, the contents or payload of the query is typically supplemented with header information or other metadata within a packet in TCP/IP and other protocol networks. Accordingly, when this functionality is multiplied by all the inputs needed to obtain the desired data, there are throughput and latency costs by repetitively generating this metadata and sending it over a computer network. In some instances, these repetitive inputs (e.g., repetitive clicks, selections, or queries) increase storage device I/O (e.g., excess physical read/write head movements on non-volatile disk) because each time a user inputs unnecessary information, such as inputting several queries, the computing system often has to reach out to the storage device to perform a read or write operation, which is time consuming, error prone, and can eventually wear on components, such as a read/write head. Further, if users repetitively issue queries, it is expensive because processing queries consumes a lot of computing resources. For example, for some search engines, a query execution plan may need to be calculated each time a query is issued, which requires a search system to find the least expensive query execution plan to fully execute the query. This decreases throughput and increases network latency, and can waste valuable time.

Aspects of the technology described herein improve the functioning of the computer itself in light of these shortcomings in existing search technologies by providing a solution that enables a search system to provide search results that match a user's intent to find items with particular visual characteristics. In particular, some aspects are directed to a search system that, given a set of input images of objects, generates one or more morphed images of objects that combine visual characteristics of the objects in the input images. For instance, a user could see one shirt with a particular desired shape and another shirt with a particular desired pattern. Images of the shirts can be submitted to the search engine, which generates a morphed image of a shirt with the desired shape and pattern. The morphed image essentially provides a virtual object; in this example, a virtual shirt. The object in a morphed image is virtual in the sense that it is not a real object but is instead created from multiple images of objects (that may be real or virtual objects themselves). A search can then be performed using the virtual shirt as search input to find items that more closely match the shape and pattern desired by the user.

In accordance with some aspects of the technology described herein, a search system receives two or more input images of objects. The objects may be of a particular object type, such as a shirt, handbag, dress, etc. The images may be uploaded to the search engine from a user device or may be identified from search results from the search engine (e.g., by performing an initial text-, voice-, or image-based search). A generative model is used by the search system to generate one or more morphed images. Each morphed image is an image of the object type in the input images. For instance, if two images of shirts are input, the generative model generates a morphed image of a shirt. The object in the morphed image combines visual characteristics of the objects in the input images. In some instances, the search system generates a single morphed image. In other instances, the search system generates multiple morphed images that vary the extent to which the object in each morphed image incorporates visual characteristic of the objects in the input images. For instance, the item in a first morphed image may be more visually similar to an item in a first input image, while the item in a second morphed image may be more visually similar to an item in a second input image. Providing multiple morphed images allows a user to select a morphed image with an object having visual characteristics that best match the user's intent.

The one or more morphed images may be presented to a user, who selects a particular morphed image for searching. The search system performs a search, for instance, on an item database, to identify items based on the item in a selected morphed image. For instance, an image-based search may be performed to identify items in the item database that are visually similar to the object in the selected morphed image. In some cases, additional search parameters, such as text queries, filters and user preferences can also be used to guide the search. Items identified from the search are returned as search results.

Aspects of the technology described herein provide a number of improvements over existing search technologies. For instance, computing resource consumption is improved relative to existing technologies. In particular, searching using morphed images enables the search engine to return search results that match a user intent, thereby allowing the user to more quickly access relevant search results. The search engine enables the user to quickly find items with visual characteristics that matches the user's intent. This eliminates (or at least reduces) the repetitive user queries, search result selections, and rendering of items because the search results comprise items with visual characteristics that correspond to what the user is seeking. Accordingly, aspects of the technology described herein decrease computing resource consumption, such as packet generation costs. For instance, a user query (e.g., an HTTP request), would only need to traverse a computer network once (or fewer times relative to existing technologies). Specifically, the contents or payload of the user query is supplemented with header information or other metadata within a packet in TCP/IP and other protocol networks once for the initial user query. Such packet for a user query is only sent over the network once or fewer times. Thus, there is no repetitive generation of metadata and continuous sending of packets over a computer network.

In like manner, aspects of the technology described herein improve storage device or disk I/O and query execution functionality, as they only need to go out to disk a single time (or fewer times relative to existing search technologies). As described above, the inadequacy of search results from existing search technologies results in repetitive user queries, search result selections, and item renderings. This causes multiple traversals to disk. In contrast, aspects described herein reduce storage device I/O because the user provides only minimal inputs and so the computing system does not have to reach out to the storage device as often to perform a read or write operation. For example, the search engine can respond with search results that satisfy the user intent from a single user query (or few queries relative to existing technology). Accordingly, there is not as much wear on components, such as a read/write head, because disk I/O is substantially reduced.

Various configurations also improve query execution resource savings. Specifically, for example, the search system calculates a query execution plan on fewer queries relative to existing search technologies. This increases throughput and decreases network latency because aspects of the technology described herein do not have to repetitively calculate query execution plans because fewer user queries need to be executed, unlike existing search technologies.

Example System for Searching Using Morphed Images

With reference now to the drawings, FIG. 1 is a block diagram illustrating an exemplary system 100 for generating morphed images and using the morphed images to perform searches in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user device 102 and a search system 104. Each of the user device 102 and search system 104 shown in FIG. 1 can comprise one or more computer devices, such as the computing device 600 of FIG. 6, discussed below. As shown in FIG. 1, the user device 102 and the search system 104 can communicate via a network 106, which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 100 within the scope of the present technology. Each may comprise a single device or multiple devices cooperating in a distributed environment. For instance, the search system 104 could be provided by multiple server devices collectively providing the functionality of the search system 104 as described herein. Additionally, other components not shown may also be included within the network environment.

The user device 102 can be a client device on the client-side of operating environment 100, while the search system 104 can be on the server-side of operating environment 100. The search system 104 can comprise server-side software designed to work in conjunction with client-side software on the user device 102 so as to implement any combination of the features and functionalities discussed in the present disclosure. For instance, the user device 102 can include an application 108 for interacting with the search system 104. The application 108 can be, for instance, a web browser or a dedicated application for providing functions, such as those described herein. This division of operating environment 100 is provided to illustrate one example of a suitable environment, and there is no requirement for each implementation that any combination of the user device 102 and the search system 104 remain as separate entities. While the operating environment 100 illustrates a configuration in a networked environment with a separate user device and search system, it should be understood that other configurations can be employed in which components are combined. For instance, in some configurations, a user device may also provide search capabilities.

The user device 102 may comprise any type of computing device capable of use by a user. For example, in one aspect, the user device may be the type of computing device 600 described in relation to FIG. 6 herein. By way of example and not limitation, the user device 102 may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device where notifications can be presented. A user may be associated with the user device 102 and may communicate with the search system 104 via the user device 102.

At a high level, a user can submit search input to the search system 104 via the user device 102. Based on the search input, the search system 104 can search an item database 116 to identify items and provide search results with the items as a response. As shown in FIG. 1, the search system 104 includes a search interface 110, a morphing module 112, and a search engine 114. These components may be in addition to other components that provide further additional functions beyond the features described herein. The search system 104 can be implemented using one or more server devices, one or more platforms with corresponding application programming interfaces, cloud infrastructure, and the like. While the search system 104 is shown separate from the user device 102 in the configuration of FIG. 1, it should be understood that in other configurations, some or all of the functions of the search system 104 can be provided on the user device 102.

In one aspect, the functions performed by components of the search system 104 are associated with one or more personal assistant applications, services, or routines. In particular, such applications, services, or routines may operate on one or more user devices, servers, may be distributed across one or more user devices and servers, or be implemented in the cloud. Moreover, in some aspects, these components of the search system 106 may be distributed across a network, including one or more servers and client devices, in the cloud, and/or may reside on a user device. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

The search interface 110 may provide a graphical user interface through which a user may interact with the search system 104, such as providing input for a search and presenting search results. The search interface 110 may also comprise an Application Program Interface (API) that lets applications submit search information (and optionally other information, such as user information, contextual information, and the like) to the search system 104. The search interface 110 can also output search results in response to search input. The search results may be provided, for instance, via a webpage displayed through a browser. The search results may also be provided through an application, such as a productivity application, personal assistant application, navigation application, shopping application, and the like.

In accordance with aspects of the technology described herein, the search interface 110 receives search input in the form of two or more images of objects. The search interface 110 may receive the images in a number of different manners. In some cases, the search interface 110 may provide an interface that allows the images to be submitted to the search system 104. For instance, the search interface 110 may provide a user interface to the user device 102 that allows a user to select images stored on the user device and submit the images to the search system 104. In some instances, the images may be retrieved from the item database 116. For instance, a user may initially submit a search query (e.g., a text-, voice-, or image-based query) and receive search results for items in the item database 116 in which the search results include images of the items. The user can then select two or more of the images. In still further instances, the input images may be based on items in a cart on an e-commerce site.

Given a selection of input images of objects, the morphing module 112 generates one or more morphed images of objects that combine visual aspects of the objects in the input images. The morphing module 112 may comprise a generative model, such as a generative adversarial network (GAN) model. The generative model may be trained on images of objects of a certain object type in order to generate new images of objects of that object type. For instance, one generative model may be trained on images of shirts to generate new images of shirts, while another generative model may be trained on images of dresses to generate new images of dresses. In further configurations, a generative model may be trained on images of different object types, such that the generative model can generate images of objects of each of those different object types, depending on the type of objects in input images submitted to the generative model for generating a new image.

Morphed images generated by the morphing module 112 comprise objects with visual features that combine visual characteristics of the input images, such as the overall shape of the object, size of the object, pattern on the object, and/or coloring of the object. In some instances, the morphing module 112 generates a single morphed image. In other instances, the morphing module 112 generates multiple morphed images in which the extent of the visual characteristics of objects of each input image varies among the morphed images. For instance, when generating morphed images from two input images, a first morphed image may be more visually similar to a first object in a first input image, a second morphed image may be more visually similar to a second object in a second input image, and third morphed image may equally combine visual characteristics from the two objects in the two input images.

Figure 2:
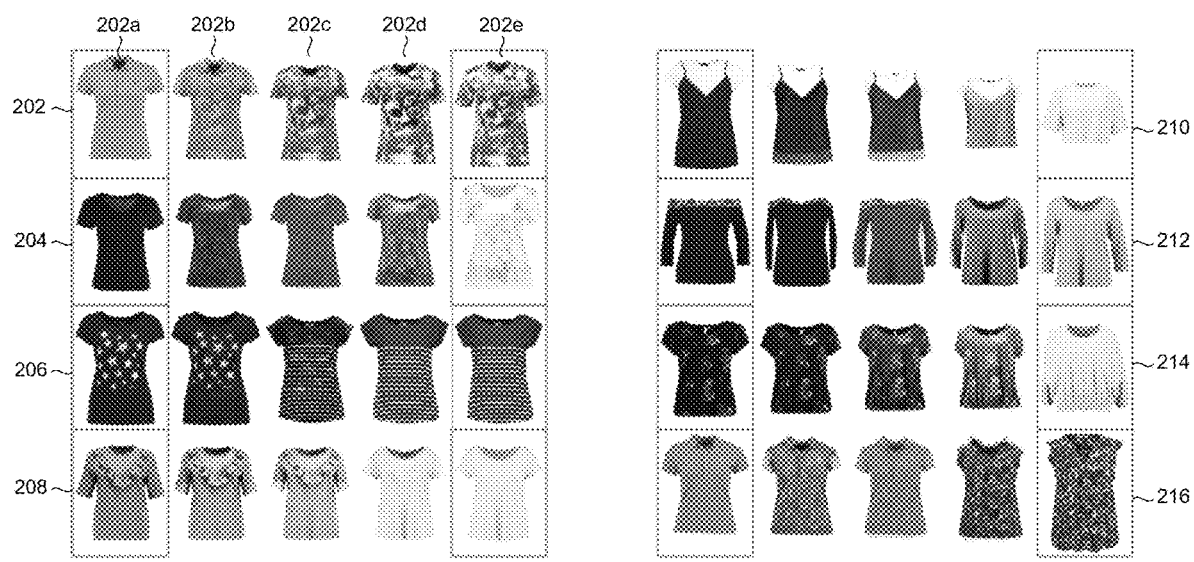
FIG. 2 is a diagram showing examples of morphed images generated from two object images in accordance with some implementations of the present disclosure.

By way of illustration, FIG. 2 provides a number of examples 202, 204, 206, 208, 210, 212, 214, 216 of morphed images generated from two input images. In these examples, a generative model has been trained on images of shirts in order to generate new images of shirts. Each example includes a series of five images. The two boxed images on the left-hand side and right-hand side of the images for each example comprise the two input images. The three images in the middle of each example comprise morphed images generated from the two input images. For instance with reference to example 202, images 202a and 202e comprise input images provided to the generative model, and images 202b, 202c, and 202d comprise morphed images generated by the generative model from the input images 202a and 202e. As can be seen from FIG. 2, the morphed images 202b, 202c, and 202d comprise images of shirts that combine visual characteristics of the shirts in the input images 202a and 202e. The morphed images 202b, 202c, and 202d, vary the extent to which the objects in the morphed images capture visual characteristics of the shirts in each input image 202a and 202e. For instance, the shirt in morphed image 202b is more visually similar to the input image 202a than the input image 202e. The shirt in morphed image 202d is more visually similar to the input image 202e than the input image 202a. Compared to the shirts in morphed images 202b and 202d, the shirt in the morphed image 202c is a more equal blend of visual characteristics from the two input images 202a and 202e.

Referring again to FIG. 1, in some configurations, morphed images generated by the morphing module 112 are presented to the user via the search interface 110. For instance, a user interface may be provided that presents one or more morphed images generated from input images by the morphing module 112. This allows the user to view the morphed images and select one for searching, if desired.

The search engine 114 queries the item database 116 using a morphed image to identify relevant items and provides search results based on identified items to the search interface 110 to return, for instance, to the user device 102. The item database 116 stores information about items that may be returned as search results in response to search queries. For instance, the item database 116 may store information regarding images of objects that may be returned as search results. In some configurations, the item database 116 may store information regarding item listings, providing information on items available for purchase. For instance, in some configurations, the search system 104 may be provided as part of a listing platform. Examples of listing platforms include e-commerce platforms, wherein listed products or services are available for purchase by a user of a client device upon navigation to the platforms. Other examples of listing platforms include rental platforms listing various items for rent (e.g., equipment, tools, real estate, vehicles, contract employees) and media platforms listing digital content items (e.g., content for download, such as images). The functionality of a listing platform includes provision of interfaces enabling surfacing of item listings for items to users of the listing platform.

The item database 116 can take the form of an inverted index, but other forms are possible. The item database 116 stores information about items in a manner that allows the search engine 114 to efficiently query the item database 116 based on a morphed image. Any of a variety of image search techniques may be employed by the search engine 114 to identify items based on a given morphed image.

In some cases, the search engine 114 may use additional search parameters in conjunction with the morphed image to perform a search on the item database 116. In some configurations, the search engine 114 can use the object type of the objects in input images and/or morphed images to search for items of the same object type. For instance, in the case of a morphed image of a shirt, the search engine 114 could confine the search to items that are categorized as shirts. Other parameters that the search engine 114 could employ include, for instance, text submitted by the user, filter parameters selected by the user (e.g., cost range, size, etc.), and user preferences of the user interacting with the search system 104. These are provided by way of example only and further parameters could be used by the search engine in conjunction with a morphed image to identify search results from the item database 116. The search engine 114 can further be configured to perform any number of operations (e.g., stop word filtering, term stemming, query augmentation, query categorization, entity identification, etc.) and to run any number of queries on the item database 116 to identify items as search results.

Figure 3:
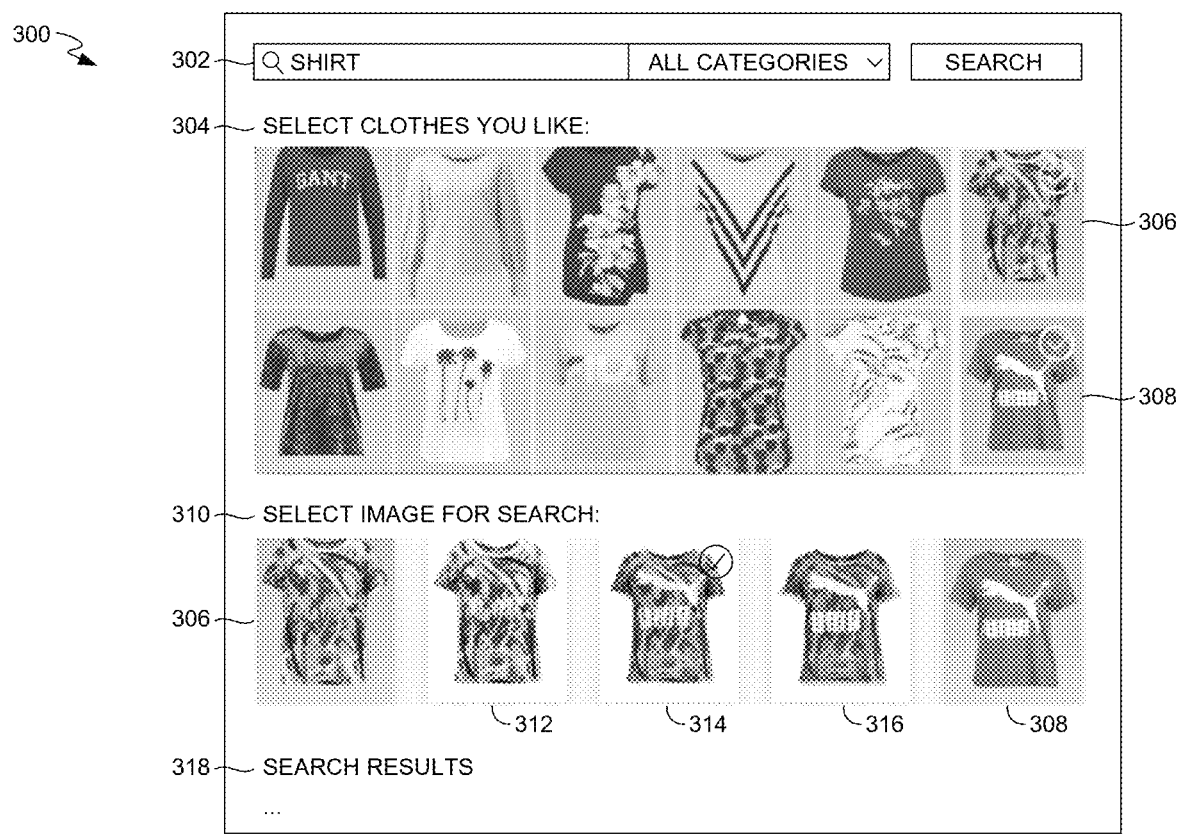
FIG. 3 is a diagram showing an example search user interface for performing a search using a morphed image in accordance with some implementations of the present disclosure.

With reference now to FIG. 3, an example user interface 300 for performing a search using a morphed image is presented. The user interface 300 may be provided, for instance, by the search interface 110 of FIG. 1. The user interface 300 includes a search text box 302, in which a user has entered a text query "shirt." An initial search is performed (e.g., by the search engine 114 on the item database 116 of FIG. 1) to identify items, which are presented on the user interface 300 as initial search results 304. The user can view the initial search results 304, and select certain images for generating morphed images. For instance, in the example of FIG. 3, the user has selected image 306 and image 308. Morphed images 312, 314, and 316 are generated (e.g., by the morphing module 112 of FIG. 1) based on the selected images 306 and 308. The morphed images 312, 314, and 316 are presented in a section 310 of the user interface 300, allowing the user to view the morphed images 312, 314, 316 and decide whether to perform a search using one. In the example of FIG. 3, the user has selected the morphed image 314. Based on the selection, a search is performed (e.g., by the search engine 114 on the item database 116 of FIG. 1) to identify items based on the morphed image 314, and search results 318 are presented for the identified items.

Figure 4:
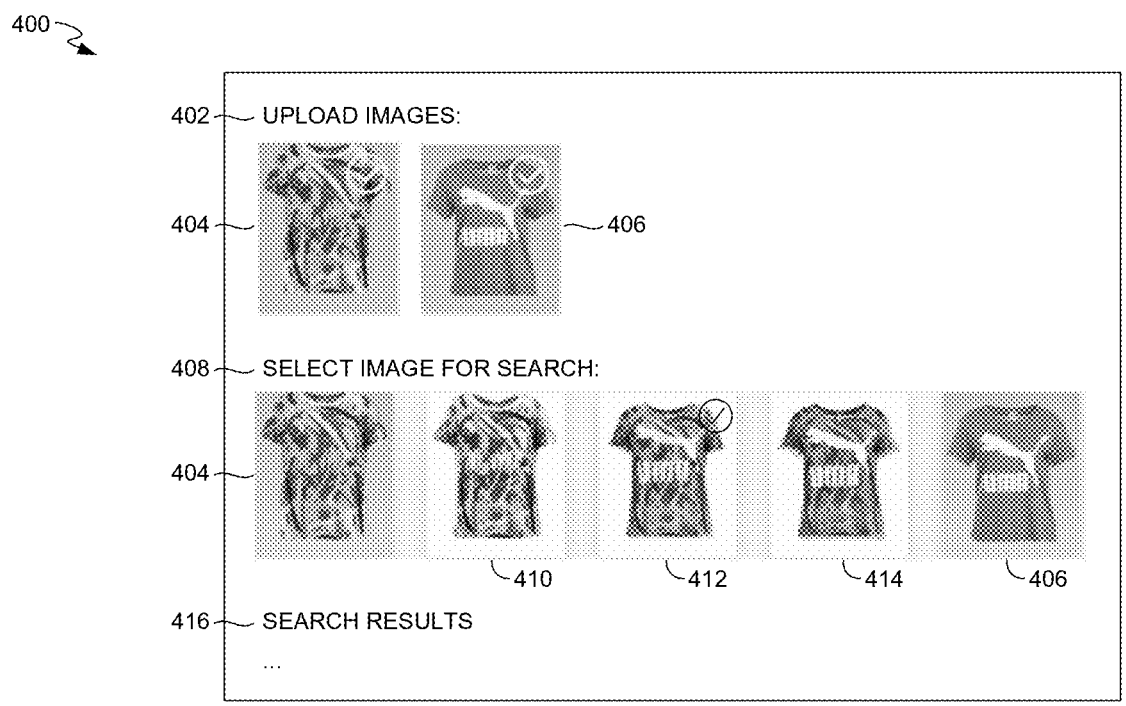
FIG. 4 is a diagram showing another example search user interface for performing a search using a morphed image in accordance with some implementations of the present disclosure.

FIG. 4 provides another example user interface 400 for performing a search using a morphed image. The user interface 400 may be provided, for instance, by the search interface 110 of FIG. 1. The user interface 400 includes an area 402 for uploading images. In some cases, a user may upload an image stored on the user device. In other instances, the user may capture a photo using a camera on the user device and upload the photo. For instance, the user may see some shirts the user likes, take a photo of each shirt, and upload the photos. As another example, the user may provide a URL for an image in order to upload an image. As shown in FIG. 4, the user has uploaded image 404 and image 406. Morphed images 410, 412, and 414 are generated (e.g., by the morphing module 112 of FIG. 1) based on the uploaded images 404 and 406. The morphed images 410, 412, and 414 are presented in a section 408 of the user interface 400, allowing the user to view the morphed images 410, 412, and 414 and decide whether to perform a search using one. In the example of FIG. 4, the user has selected the morphed image 412. Based on the selection, a search is performed (e.g., by the search engine 114 on the item database 116 of FIG. 1) to identify items based on the morphed image 412, and search results 416 are presented for the identified items.

Example Method for Searching Using Morphed Images

Figure 5:
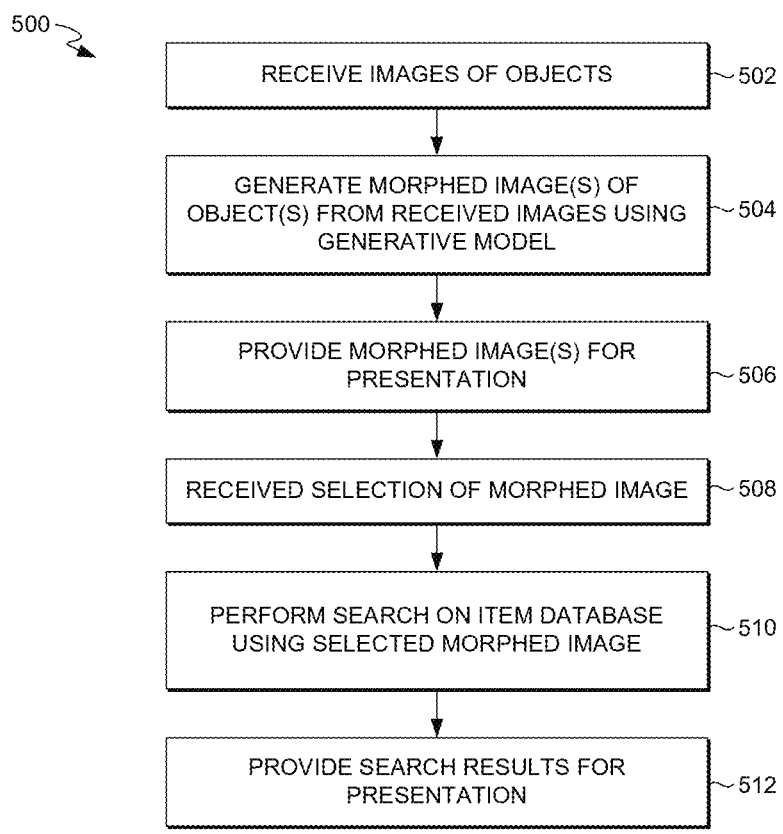
FIG. 5 is a flow diagram showing a method for generating a morphed image and using the morphed image to perform a search in accordance with some implementations of the present disclosure.

With reference now to FIG. 5, a flow diagram is provided that illustrates a method 500 for generating a morphed image and using the morphed image to perform a search. The method 500 may be performed, for instance, by the search system 104 of FIG. 1. Each block of the method 500 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 502, input images of objects of a particular object type are received. For instance, the input images may be of a clothing item, such as shirts, pants, or dresses. The input images may be received in a number of different ways. For instance, in some cases, a user may upload the input images. In other cases, the input images may be selected from search results returned from an initial search performed on an item database using an initial search query (e.g., a text-, voice-, or image-based query)

One or more morphed images are generated by a generative model using the input images, as shown at block 504. The generative model may comprise, for instance, a GAN model and may have been trained on images of objects of the type of object in the input images. As such, each morphed image created by the generative model comprises an object of the object type of the input images. For instance, if the input images are shirts, a generative model trained on images of shirts may be employed to generate a morphed image of a shirt. The object in each morphed image combines visual characteristics of the objects in the input images, such as, for instance, the overall shape of the object, size of the object, pattern on the object, and/or coloring of the object. In some configurations, a single morphed image is generated. In other configurations, multiple morphed images are generated that vary the extent to which the object in each morphed image incorporates visual characteristics of the objects in the input images.

The morphed image(s) are provided for presentation, as shown at block 506. For instance, a user interface such as the user interface 300 of FIG. 3 or the user interface 400 of FIG. 4 may be provided to present the morphed image(s) to a user. A user can review the morphed image(s) and decide whether to perform a search for items based on a morphed image. Accordingly, input indicative of a selection of a morphed image is received, as shown at block 508. In the case of a single morphed image being generated and presented, input may be received to perform a search with that morphed image. In the case of multiple morphed images being generated and presented, input may be received to perform a search using a morphed image selected from the set of morphed images presented to the user. In further configurations, input can be received to perform a search using multiple morphed images.

A search is performed on an item database using the selected morphed image, as shown at block 510. The search may comprise an image-based search using the selected morphed image as an image query to identify items having a visual similarity to the object in the morphed image. In some cases, the search may use additional search parameters, such as, for instance, the object type of the object in the morphed image, text submitted by the user, filter parameters selected by the user (e.g., cost range, size, etc.), and user preferences of the user interacting with the search system. Search results for items identified from the item database based on the search are returned for presentation, as shown at block 512.

Although not shown in FIG. 5, the process of generating morphed images and performing searches can be repeated. For instance, a user may select an item from the search results, and one or more morphed images can be generated using an image of the selected item. For instance, the generative model can generate a new morphed image using the image of the selected item with at least one of the input images received at block 502, a morphed image generated at block 504, and/or an image of another item selected from the search results. The search system can use the new morphed image to perform a search, for instance, on the item database, and return search results for items visually similar to the new morphed image.

Exemplary Operating Environment

Figure 6:
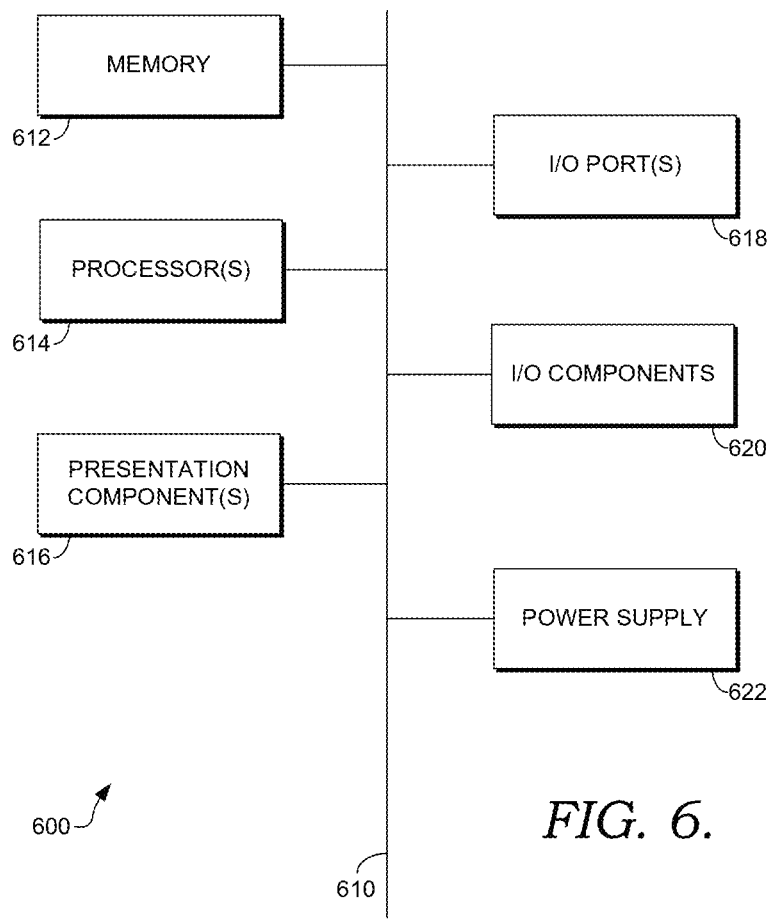
FIG. 6 is a block diagram of an exemplary computing environment suitable for use in implementations of the present disclosure.

Having described implementations of the present disclosure, an exemplary operating environment in which embodiments of the present technology may be implemented is described below in order to provide a general context for various aspects of the present disclosure. Referring initially to FIG. 6 in particular, an exemplary operating environment for implementing embodiments of the present technology is shown and designated generally as computing device 600. Computing device 600 is but one example of a suitable computing environment and is not intended to suggest any limitation as to the scope of use or functionality of the technology. Neither should the computing device 600 be interpreted as having any dependency or requirement relating to any one or combination of components illustrated.

The technology may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 6 is merely illustrative of an exemplary computing device that can be used in connection with one or more embodiments of the present technology. Distinction is not made between such categories as "workstation," "server," "laptop," "handheld device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 600. The computing device 600 may be equipped with depth cameras, such as, stereoscopic camera systems, infrared camera systems, RGB camera systems, and combinations of these for gesture detection and recognition. Additionally, the computing device 600 may be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described herein may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology may generally refer to the technical solution environment and the schematics described herein, it is understood that the techniques described may be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method comprising:
   receiving two or more images of objects of a type of object;
   generating, using a generative model trained on images of objects of the type of object, one or more morphed images, each morphed image showing an object of the type of object combining visual characteristics of the objects from the received two or more images;
   providing the one or more morphed images for presentation;
   receiving input indicative of a selection of a first morphed image from the one or more morphed images;
   performing a search on an item database using the selected first morphed image as search input to identify one or more search results;
   providing the one or more search results for presentation;
   receiving a selection of a first search result from the one or more search results;
   generating, using the generative model, a further morphed image using the selected first morphed image and an image corresponding to the first search result;
   performing a search on the item database using the further morphed image as search input to identify one or more further search results; and
   providing the one or more further search results for presentation.

2. The computer-implemented method of claim 1, wherein the received two or more images are received from a user device.

3. The computer-implemented method of claim 1, wherein each object from the received two or more images comprises an item from the item database.

4. The computer-implemented method of claim 1, wherein the generative model comprises a generative adversarial network trained on the images of objects of the type of object.

5. The computer-implemented method of claim 1, wherein a plurality of morphed images are generated by the generative model, wherein a first morphed image from the plurality of morphed images shows a first object having a visual similarity closer to the object of a first received image, and wherein a second morphed image from the plurality of morphed images shows a second object having a visual similarity closer to the object of a second received image.

6. The computer-implemented method of claim 1, wherein the search is performed on the item database using one or more additional search parameters selected from the following: a text input, a filter selection, and a user preference.

7. One or more computer storage media storing computer-useable instructions that, when used by a computing device, cause the computing device to perform operations, the operations comprising:
   receiving two or more images of objects of a type of object;
   generating, using a generative model trained on images of objects of the type of object, one or more morphed images, each morphed image showing an object of the type of object combining visual characteristics of the objects from the received two or more images;
   providing the one or more morphed images for presentation;
   receiving input indicative of a selection of a first morphed image from the one or more morphed images;
   performing a search on an item database using the selected first morphed image as search input to identify one or more search results;
   providing the one or more search results for presentation;
   receiving a selection of a first search result from the one or more search results;
   generating, using the generative model, a further morphed image using the selected first morphed image and an image corresponding to the first search result;

performing a search on the item database using the further morphed image as search input to identify one or more further search results; and providing the one or more further search results for presentation.

8. The computer storage media of claim 7, wherein the received two or more images are received from a user device.

9. The computer storage media of claim 7, wherein each object from the received two or more images comprises an item from the item database.

10. The computer storage media of claim 7, wherein the generative model comprises a generative adversarial network trained on the images of objects of the type of object.

11. The computer storage media of claim 7, wherein a plurality of morphed images are generated by the generative model, wherein a first morphed image from the plurality of morphed images shows a first object having a visual similarity closer to the object of a first received image, and wherein a second morphed image from the plurality of morphed images shows a second object having a visual similarity closer to the object of a second received image.

12. The computer storage media of claim 7, wherein the search is performed on the item database using one or more additional search parameters selected from the following: a text input, a filter selection, and a user preference.

13. A computer system comprising:
a processor; and
a computer storage medium storing computer-useable instructions that, when used by the processor, causes the computer system to perform operations comprising:
receiving two or more images of objects of a type of object;
generating, using a generative model trained on images of objects of the type of object, one or more morphed images, each morphed image showing an object of the type of object combining visual characteristics of the objects from the received two or more images;
providing the one or more morphed images for presentation;
receiving input indicative of a selection of a first morphed image from the one or more morphed images;
performing a search on an item database using the selected first morphed image as search input to identify one or more search results;
providing the one or more search results for presentation;
receiving a selection of a first search result from the one or more search results.
generating, using the generative model, a further morphed image using the selected first morphed image and an image corresponding to the first search result;
performing a search on the item database using the further morphed image as search input to identify one or more further search results; and
providing the one or more further search results for presentation.

14. The computer system of claim 13, wherein the received two or more images are received from a user device.

15. The computer system of claim 13, wherein each object from the received two or more images comprises an item from the item database.

16. The computer system of claim 13, wherein the generative model comprises a generative adversarial network trained on the images of objects of the type of object.

17. The computer system of claim 13, wherein a plurality of morphed images are generated by the generative model, wherein a first morphed image from the plurality of morphed images shows a first object having a visual similarity closer to the object of a first received image, and wherein a second morphed image from the plurality of morphed images shows a second object having a visual similarity closer to the object of a second received image.

* * * * *